United States Patent [19]

McClellan, Jr.

[11] 4,406,982
[45] Sep. 27, 1983

[54] DC MOTOR CONTROL CIRCUIT

[75] Inventor: Theodore A. McClellan, Jr., Elberta, Mich.

[73] Assignee: T. & L. Enterprises, Inc., Elberta, Mich.

[21] Appl. No.: 320,514

[22] Filed: Nov. 12, 1981

[51] Int. Cl.³ .............................................. H02P 5/16
[52] U.S. Cl. .................................. 318/345 F; 318/139; 318/349; 307/248
[58] Field of Search .............. 318/139, 245, 246, 249, 318/251, 339, 342, 345 F, 347, 349; 323/269, 311, 325; 307/248, 253

[56] References Cited

U.S. PATENT DOCUMENTS

| | | | |
|---|---|---|---|
| 2,980,845 | 4/1961 | Thompson et al. | 323/269 |
| 2,981,879 | 4/1961 | Taylor et al. | 318/345 F |
| 3,153,187 | 10/1964 | Klees | 323/269 |
| 3,170,070 | 2/1965 | Schuchard | 307/253 |
| 3,278,849 | 10/1966 | Emery, Jr. | 307/253 X |
| 3,336,484 | 8/1967 | Oushinsky | 307/248 |
| 3,345,551 | 10/1967 | Slavin et al. | 318/345 F |
| 3,443,187 | 5/1969 | Beaulieu | 318/345 F X |
| 3,941,198 | 2/1976 | Kappas | 318/349 X |
| 4,202,032 | 5/1980 | Morez | 318/349 X |

FOREIGN PATENT DOCUMENTS 2264419  3/1974  France .

Primary Examiner—J. V. Truhe
Assistant Examiner—W. E. Duncanson, Jr.
Attorney, Agent, or Firm—Price, Heneveld, Huizenga & Cooper

[57] ABSTRACT

A DC motor control circuit including a DC voltage source, a DC motor electrically connected in series with the voltage source and a controllable current control device electrically connected totally in series with the voltage source and the motor. A rheostat electrically connects the current input and control input terminals of the current control device so that the current flowing through the circuit may be varied by varying the resistance provided by the rheostat. All current flowing through the current control device also flows through the motor.

10 Claims, 1 Drawing Figure

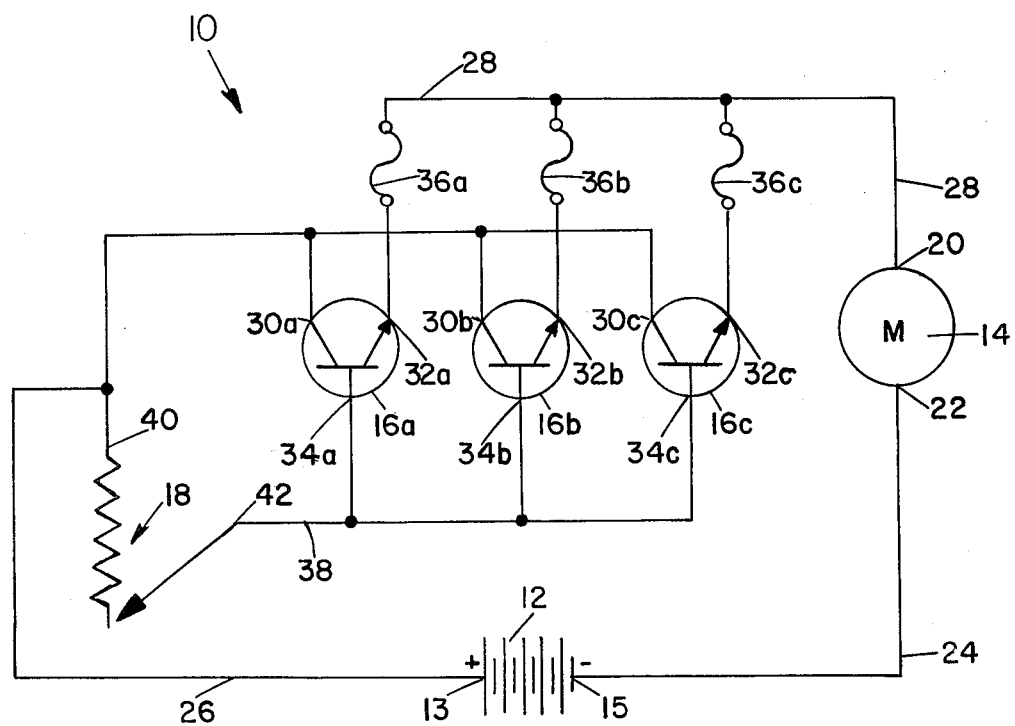
FIG_1

DC MOTOR CONTROL CIRCUIT

BACKGROUND OF THE INVENTION

The present invention relates to DC motor control circuits and, more particularly, DC motor control circuits incorporating current control devices.

A DC motor is typically operated by electrically connecting the motor in series with a DC voltage source to apply a DC voltage across the motor terminals. Additionally, a switch is often electrically connected in series with the motor and voltage source to selectively actuate and deactuate the motor. Such a switch merely permits the motor to be turned off and on and does not allow the motor speed to be varied.

Consequently, DC motor control circuits have been developed to provide a means of controlling the speed of the motor. Probably the simplest of these control devices is a rheostat connected in series with the voltage source and the motor. Because the motor generally operates at a speed proportional to the voltage applied across the motor, the speed at which the motor operates may be varied by varying the resistance provided by the rheostat. If the rheostat is set to provide its minimum resistance, relatively little voltage is lost across the rheostat and a maximum voltage is applied across the motor causing the motor to operate at maximum speed. On the other hand, if the rheostat is set to provide its maximum resistance, a relatively large voltage develops at the rheostat and a relatively small voltage is applied across the terminals of the motor causing the motor to operate at minimum speed.

Solid state control circuits have also been developed to regulate the speed of these motors. Typically, these control devices regulate the speed of the motor by regulating the current, rather than the voltage, supplied to the motor. Because the speed of the motor is also proportional to the current supplied to the motor, current control devices may be utilized to regulate motor speed. Such devices typically have three terminals—a current input terminal, a current output terminal and a control input terminal. Usually, a current control device is connected by the current input and current output terminals in series with the motor to provide current to the motor. Further, the control input terminal of the semiconductor device is typically connected in parallel with the motor to the voltage source. Consequently, the biasing current flowing into the control input terminal bypasses the motor resulting in wasted current and energy since no work is realized from the biasing current. Further, in such a configuration a resistor having a relatively large resistance must be inserted in series between the voltage source and the control input terminal to limit the current entering that terminal to a reasonable value. This results in further complexity and cost of the circuitry as well as additional power dissipation.

SUMMARY OF THE INVENTION

The aforementioned problems are solved by the present invention. Essentially, a DC motor control circuit is provided having a DC voltage source, a DC motor electrically connected in series with the voltage source and a controllable current control device including a current input terminal, a current output terminal and a control input terminal. The current control device is connected in series by the current input and output terminals with the motor and the voltage source. The control circuit further includes an element for providing a variable resistance between the current input terminal and the control input terminal.

The speed at which the motor operates may be varied by varying the resistance provided by the variable resistance element. Further, because the current control device is totally in series with the motor, all current passing through the current control device must also pass through the motor insuring that the circuit operates with little power dissipation. Finally, because the collector is connected directly to the base, a fixed resistance, in addition to any resistance provided by the variable resistance element is not required, further reducing power dissipation.

These and other objects, advantages and features of the invention will be more fully understood and appreciated by reference to the written specification and appended drawings.

BRIEF DESCRIPTION OF THE DRAWING

FIG. 1 is a schematic diagram of the DC motor control circuit of the present invention.

DESCRIPTION OF THE PREFERRED EMBODIMENT

A DC motor control circuit in accordance with a preferred embodiment of the invention is illustrated in the drawing and generally designated 10. Circuit 10 includes a battery 12, motor 14, power transistors 16 and rheostat 18. Motor 14 is electrically connected in series to battery 12. Transistors 16 are electrically connected in parallel to one another and in series with motor 14. Rheostat 18 interconnects collectors 30 and bases 34 of transistors 16.

The current supplied to motor 14 is controlled by transistors 16. As is well known to those skilled in the art, the amount of current flowing through the collector-emitter circuit of the transistor is generally proportional to the current flowing through the base. The amount of control current supplied to bases 34 of transistors 16 is varied by varying the setting of rheostat 18. When rheostat 18 is set to provide a fairly high resistance, relatively little base current is supplied to transistors 16 and, accordingly, relatively little current is supplied to motor 14. On the other hand, when rheostat 18 is set to provide relatively little resistance, a relatively large base current is supplied to transistors 16 and, accordingly, motor 14.

Both battery 12 and motor 14 are well known to those skilled in the art. Suffice it to say that battery 12 is a DC battery having a voltage, or potential, across positive terminal 13 and negative of 36 volts. Of course, a battery supplying a different voltage may be used depending upon the other elements in circuit 10. Motor 14 is a DC motor having a 36-volt rating. The motor of the preferred embodiment is that manufactured and sold as Model No. BA 3644-1186-9-48B by Honeywell. This specific motor is a 1½ horsepower motor designed to operate at a maximum 3300 rpm while drawing a current of 35 amps. In a preferred embodiment, motor 14 is mounted on and powers a bicycle. Motor 14 includes a first terminal 20 connected through conductors 26 and 28 and transistors 16 to positive terminal 13 on battery 12 and a second terminal 22 electrically connected through conductor 24 to the negative terminal 15 on battery 12.

Transistor 16a includes a collector, or current input terminal, 30a, an emitter, or current output terminal, 32a, and a base, or control input terminal, 34a. Collector 30a is electrically connected to conductor 26 and emitter 32a is electrically connected to conductor 28 so that the collector-emitter circuit of transistor 16a is electrically connected in series with motor 14 and battery 12.

Transistors 16b and 16c are also NPN transistors having collectors 30b and 30c, emitters 32b and 32c and bases 34b and 34c. The collector-emitter circuits of transistors 16b and 16c are also connected in series with battery 12 and motor 14. Consequently, collectors 30a, 30b and 30c are electrically connected to one another and emitters 32a, 32b and 32c are electrically connected to each other so that the collector-emitter circuits of transistors 16a, 16b and 16c are electrically connected in parallel with one another. The transistors of the preferred embodiment are NPN transistors manufactured and sold by Motorola under Model No. 2N5685. Such transistors have a maximum collector current of 50 amps and a maximum base current of 15 amps.

Fuses 36a, 36b and 36c are electrically connected between conductor 28 and emitters 32a, 32b and 32c, respectively, to protect transistors 16. In a preferred embodiment of the invention, each of fuses 36 has a 50 amp rating and will blow if the current flowing through its respective transistor 16 exceeds 50 amps.

Rheostat 18 is electrically connected by first terminal 40 to conductor 26 and by second terminal 42 to conductor 38, which in turn is electrically connected to each of bases 34. Rheostat 18 provides a variable resistance to circuit 10 between approximately zero ohms and approximately 150 ohms. Additionally, rheostat 18 may be turned off altogether opening the circuit between conductors 26 and 38.

OPERATION

When rheostat 18 is turned off, no biasing current flows through rheostat 18 and conductor 38 to bases 34 and, consequently, no current flows through the collector-emitter circuit to motor 14. However, when rheostat 18 is set to its maximum resistance, a relatively small amount of biasing current flows through rheostat 18 and conductor 38 to bases 34. When so biased, transistors 16 cause a relatively small current to flow from battery 12 through their respective collector-emitter circuits to motor 14 to power the motor at its minimum speed. As rheostat 18 is set to provide relatively little resistance, a relatively large current flows through rheostat 18 and conductor 38 to bases 34. When so biased, transistors 16 conduct a relatively large current through their collector-emitter circuits to motor 14. Eventually, if rheostat 18 is set to provide no resistance, the maximum biasing current is supplied to bases 34 causing transistors 16 to conduct the maximum current through their collector-emitter circuits. At this point, motor 14 operates at its maximum speed. If any of the currents through transistors 16 exceeds 50 amps, that transistor's respective fuse 36 will blow preventing additional current from flowing through the transistor. The speed of motor 14 may be infinitely varied between its maximum and minimum speeds by varying the resistance provided by rheostat 18. Additionally, motor 14 may be stopped by turning rheostat 18 off opening the circuit between conductor 26 and bases 34.

Because all of the current flowing through transistors 16 also passes through motor 14, circuit 10 operates at greater efficiency than has been possible in prior control circuits. No current is allowed to bypass, and be lost around, the load or motor 14. Additionally, because collectors 30 and bases 34 are connected directly together using rheostat 18, an additional fixed resistance is not required between the voltage source and bases 34. This simplifies the complexity of the circuit and also the cost. Further, the elimination of the additional fixed resistor reduces the power consumption of circuit 10.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

I claim:

The embodiments of the invention in which an exclusive property or privilege is claimed are defined as follows:

1. A DC motor control circuit comprising:
   a DC voltage source;
   a DC motor electrically connected in series with said voltage source;
   a controllable current control device having a current input terminal, a current output terminal, and a control input terminal, said control device being electrically connected in series by said current input terminal and said current output terminal with said voltage source and said motor; and
   variable resistance means connected between said current input terminal and said control input terminal for controlling the speed of said motor, all of the current passing through said current control device also passing through said motor.

2. A circuit as defined in claim 1 wherein said battery includes a positive terminal and said current control device is electrically connected between said positive terminal of said voltage source and said motor.

3. A circuit as defined in claim 2 wherein said current control device comprises an NPN transistor.

4. A circuit as defined in claim 3 further comprising a fuse electrically connected in series to said current output terminal.

5. A circuit as defined in claim 1 wherein said current control device comprises an NPN transistor.

6. An electrical circuit comprising:
   a DC voltage source having a positive terminal and a negative terminal;
   a load having first and second terminals, said second terminal being electrically connected to said negative terminal on said voltage source;
   a first controllable current control device having a control input terminal, a current input terminal and a current output terminal, said current input terminal being electrically connected to said positive terminal of said voltage source and said current output terminal being electrically connected to said first terminal on said load; and
   variable resistance means connected between said current input terminal and said control input terminal, said means having a first terminal electrically connected to said current input terminal and a second terminal electrically connected to said control input terminal, whereby all of the current passing through said current control device also passes through said load and said current may be varied by varying the resistance provided by said means.

7. A circuit as defined in claim 6 wherein said current control device comprises a first NPN transistor.

8. A circuit as defined in claim 7 further comprising a fuse electrically connected in series between said current output terminal and said load.

9. A circuit as defined in claim 7 further comprising at least one additional NPN transistor electrically connected in parallel with said first NPN transistor.

10. A circuit as defined in claim 6 further comprising at least one additional controllable current control device electrically connected in parallel with said first current control device.

* * * * *